United States Patent
Iwasaki

(10) Patent No.: US 9,355,338 B2
(45) Date of Patent: May 31, 2016

(54) IMAGE RECOGNITION DEVICE, IMAGE RECOGNITION METHOD, AND RECORDING MEDIUM

(71) Applicant: YAHOO JAPAN CORPORATION, Tokyo (JP)

(72) Inventor: Masajiro Iwasaki, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 292 days.

(21) Appl. No.: 14/021,497

(22) Filed: Sep. 9, 2013

(65) Prior Publication Data
US 2015/0063686 A1    Mar. 5, 2015

(30) Foreign Application Priority Data
Aug. 28, 2013 (JP) ................................ 2013-177361

(51) Int. Cl.
G06K 9/46 (2006.01)
G06K 9/68 (2006.01)
G06F 17/30 (2006.01)

(52) U.S. Cl.
CPC ........ G06K 9/6857 (2013.01); G06F 17/30256 (2013.01); G06K 9/4676 (2013.01); G06K 9/685 (2013.01); G06K 2009/4666 (2013.01); G06K 2209/21 (2013.01); G06T 2207/20016 (2013.01)

(58) Field of Classification Search
USPC ....................................................... 382/155
See application file for complete search history.

(56) References Cited

U.S. PATENT DOCUMENTS

2005/0074167 A1* 4/2005 Maeda et al. .................. 382/190
2005/0220341 A1* 10/2005 Akahori ............. G06K 9/00664
382/170
2006/0260988 A1* 11/2006 Schneider et al. ............ 209/583

(Continued)

FOREIGN PATENT DOCUMENTS

JP 2012-103865 A 5/2012
JP 2012-203669 A 10/2012
JP A-2012-238121 12/2012

OTHER PUBLICATIONS

Y. Ke and R. Sukthankar, Pca-sift: A more distinctive representation for local image descriptors, CVPR2004, vol. 2, pp. 506-513, 2004.*

(Continued)

*Primary Examiner* — Kim Vu
*Assistant Examiner* — Nathan Bloom
(74) *Attorney, Agent, or Firm* — Oliff PLC

(57) ABSTRACT

A delivery device according to the present invention includes a learning image storage unit, a first recognition unit, a second recognition unit, and a registration unit. The learning image storage unit stores at least one piece of learning image. The first recognition unit recognizes a recognition target image using the learning image stored in the learning image storage unit. The second recognition unit recognizes the recognition target image with finer precision than that of the first recognition unit, when the first recognition unit fails to recognize the recognition target image. When the second recognition unit succeeds in recognizing the recognition target image, the registration unit registers information on the successfully recognized recognition target image in a storage unit.

20 Claims, 8 Drawing Sheets

(56) References Cited

U.S. PATENT DOCUMENTS

| | | | |
|---|---|---|---|
| 2009/0018980 A1* | 1/2009 | Zhang et al. | 706/12 |
| 2010/0027895 A1* | 2/2010 | Noguchi et al. | 382/224 |
| 2010/0310182 A1* | 12/2010 | Kroepfl et al. | 382/216 |
| 2012/0051628 A1* | 3/2012 | Noguchi et al. | 382/159 |
| 2012/0062597 A1* | 3/2012 | Mori | 345/636 |
| 2012/0106790 A1* | 5/2012 | Sultana et al. | 382/103 |
| 2012/0243734 A1* | 9/2012 | Greig | 382/103 |
| 2013/0202213 A1* | 8/2013 | Adamek et al. | 382/201 |
| 2014/0286527 A1* | 9/2014 | Harthattu et al. | 382/103 |

OTHER PUBLICATIONS

Chih-Fong Tsai, "Bag-of-Words Representation in Image Annotation: A Review," ISRN Artificial Intelligence, vol. 2012, Article ID 376804, Aug. 26, 2012.*

Jun. 9, 2015 Office Action issued in Japanese Application No. 2013-177361.

Koichi Kise, "Specific Object Recognition", IEICE Techinical Report, Japan, the Institute of Electronics, Information and Communication Engineers, Nov. 19, 2009, vol. 109, No. 306. pp. 79 to 87.

* cited by examiner

FIG.4

| LEARNING IMAGE | BoF | TAG | ... |
|---|---|---|---|
| P01 | 01 | J11 | ... |
| ... | ... | ... | ... |
| P11 | 11 | J11 | ... |
| P13 | 13 | J13 | ... |
| ... | ... | ... | ... |
| P14 | 14 | J14 | ... |
| ... | ... | ... | ... |

120

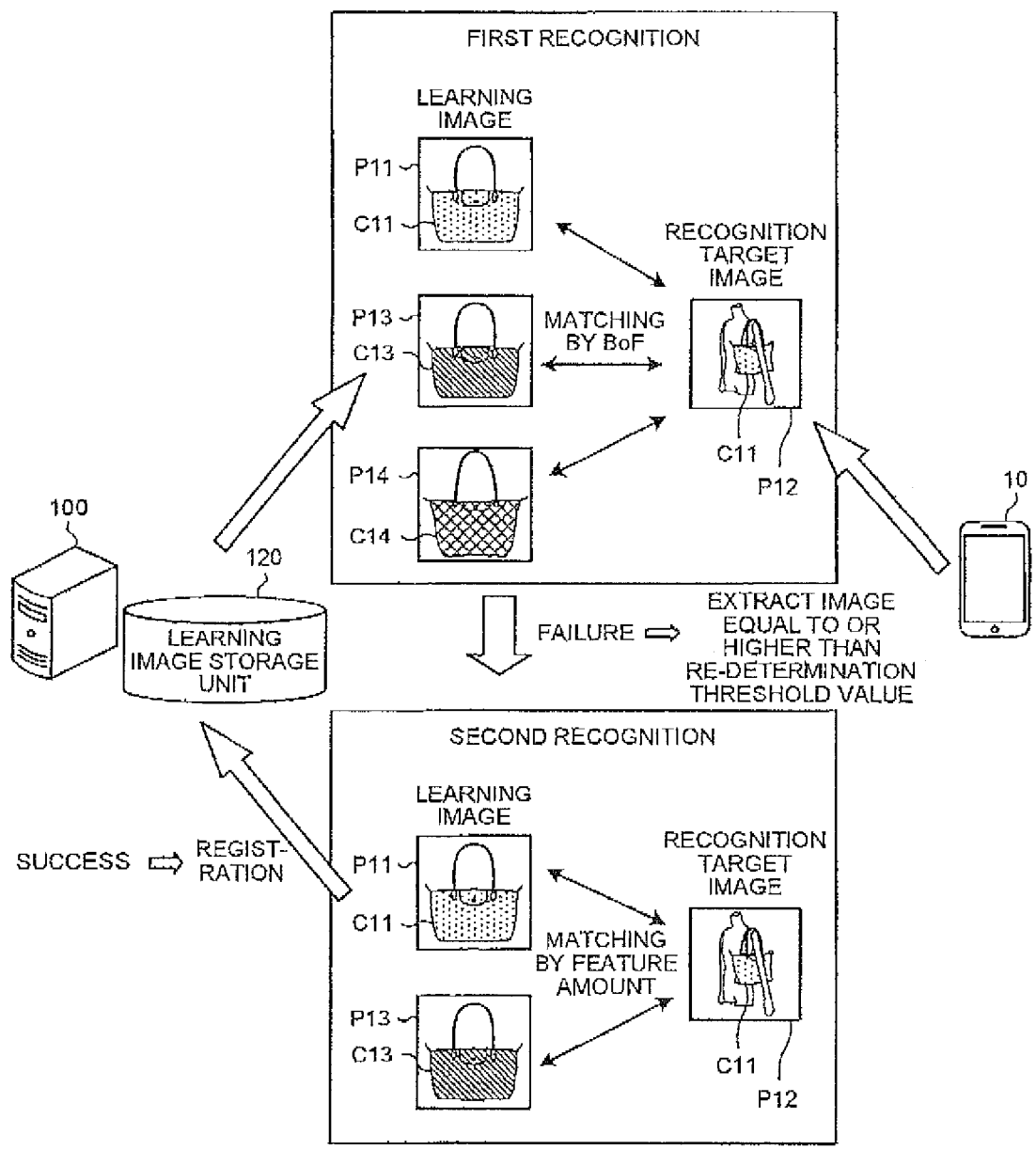

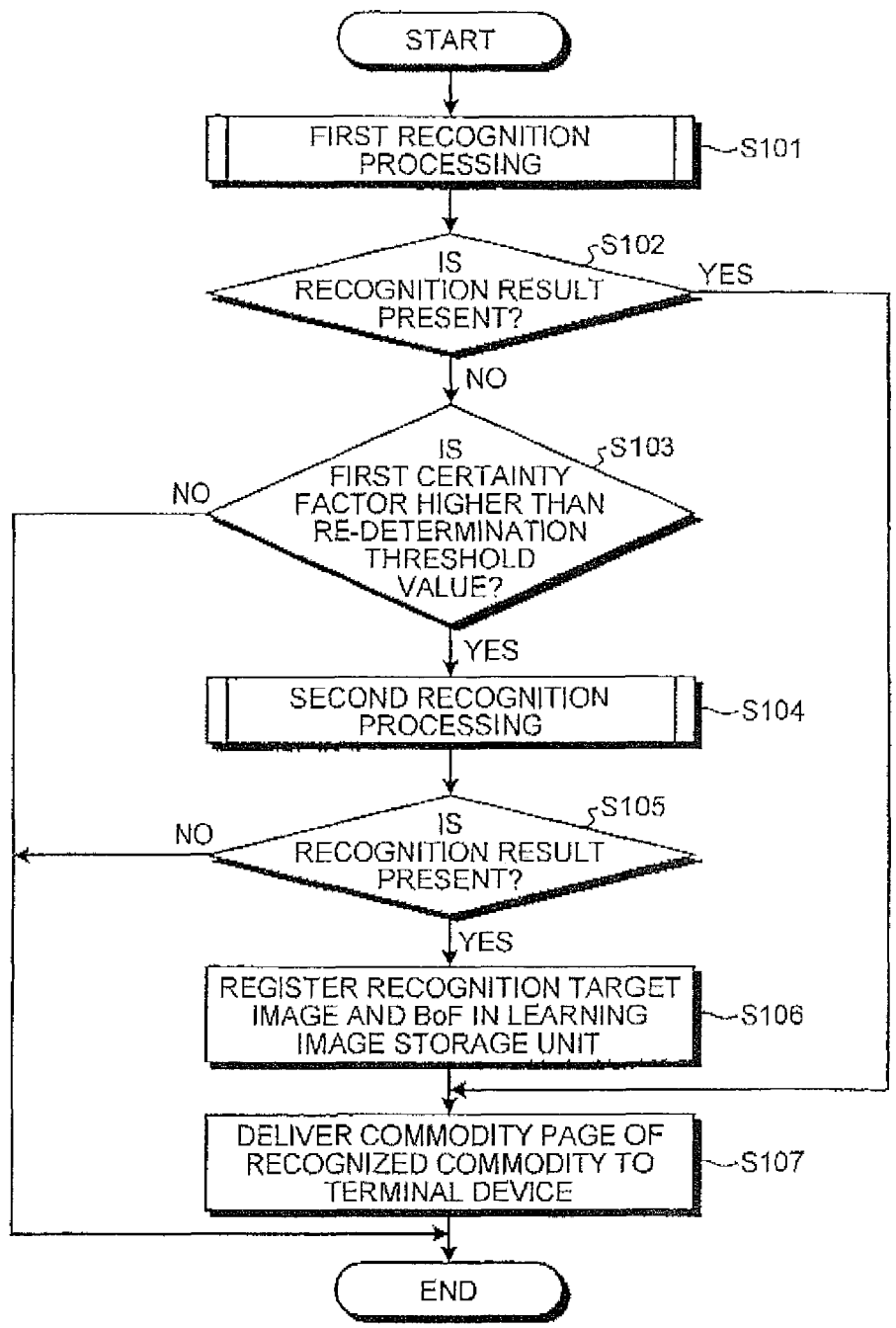

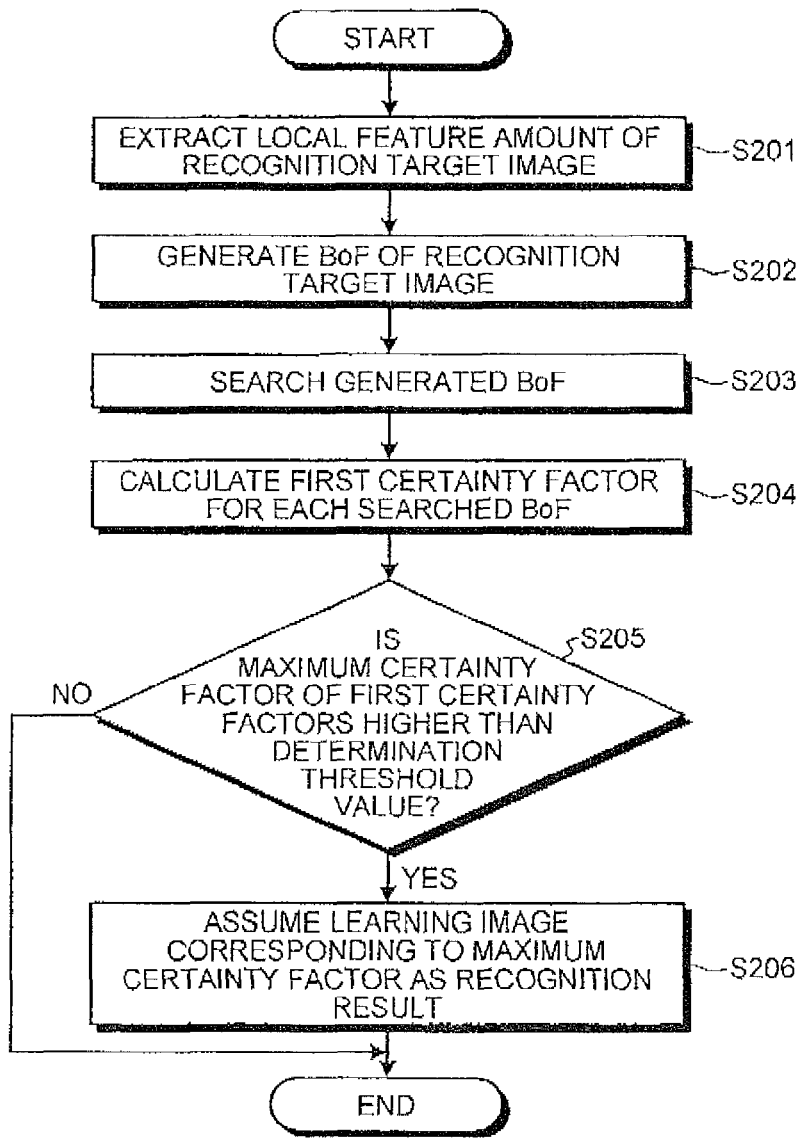

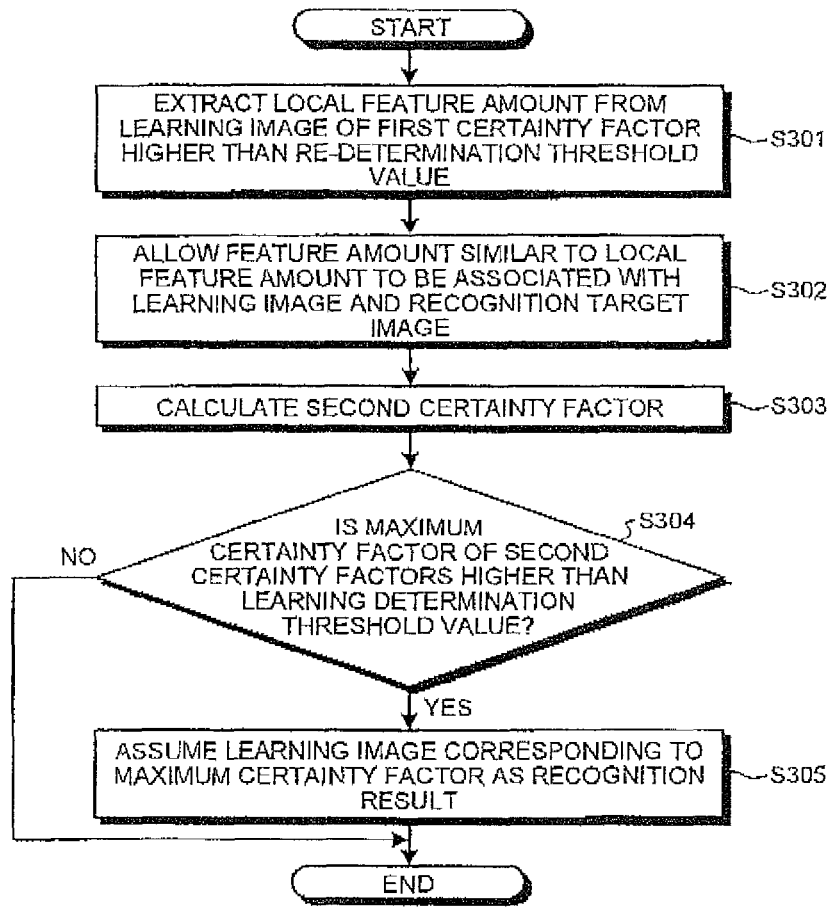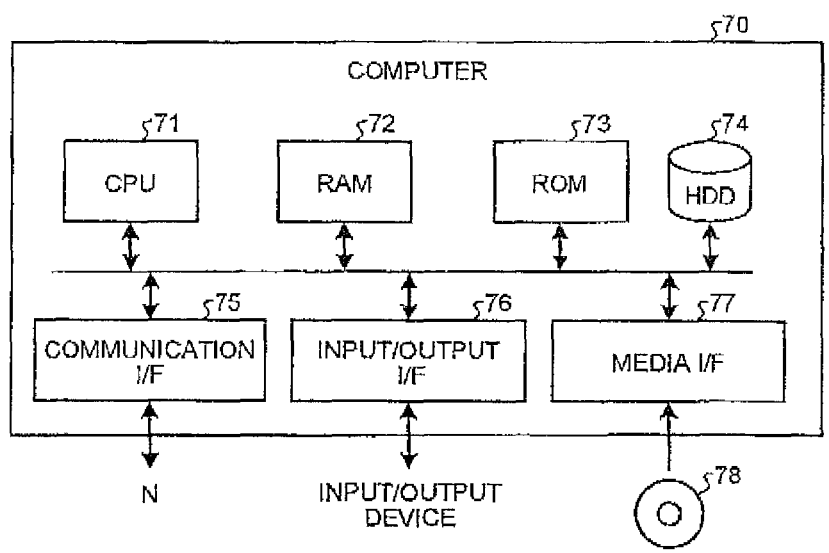

IMAGE RECOGNITION DEVICE, IMAGE RECOGNITION METHOD, AND RECORDING MEDIUM

CROSS-REFERENCE TO RELATED APPLICATIONS

The present application claims priority to and incorporates by reference the entire contents of Japanese Patent Application No. 2013-177361 filed in Japan on Aug. 28, 2013.

BACKGROUND OF THE INVENTION

1. Field of the Invention

The present invention relates to an image recognition device, an image recognition method, and a recording medium.

2. Description of the Related Art

An image recognition for extracting a feature of a target object image on which a target object is delineated, and for recognizing the target object has been known. For example, the target object is a commodity of a recognition target and is a bag and so on, as an example. As a technique related to such image recognition, a technique adding a dictionary data has been known. Specifically, such technique cuts out a local area from the target object image, calculates a feature amount for recognizing the target object from the local area for each image, calculates similarity between the feature amounts, which are calculated for each image, for each local area, registers one of the feature amounts in each local area as the dictionary data with respect to the target object when feature amounts whose similarity is equal to or higher than a threshold value are present.

Patent Literature Japanese Laid-open Patent Publication No. 2012-238121

In related art described above, however, the high-precision image recognition has not been always performed at high speed. Specifically, since the above-described technique calculates the similarity between the feature amount of the local area of the target object image and the feature amount of the local area registered in the dictionary data, for each local area, it takes a long time to recognize the target object image because of great operation quantities. In the above-described technique, furthermore, if lowering recognition precision so as to performing the image recognition at high speed, it is unable to recognize a coarse image which is photographed under different conditions, resulting in lacking practicality. For these reasons, in the above-described related art, the high-precision image recognition has not been always performed at high speed.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a learning image storage unit according to the embodiment;

FIG. 6 is an explanatory diagram illustrating an example of a recognition processing by the delivery device according to the embodiment;

Figure 1:
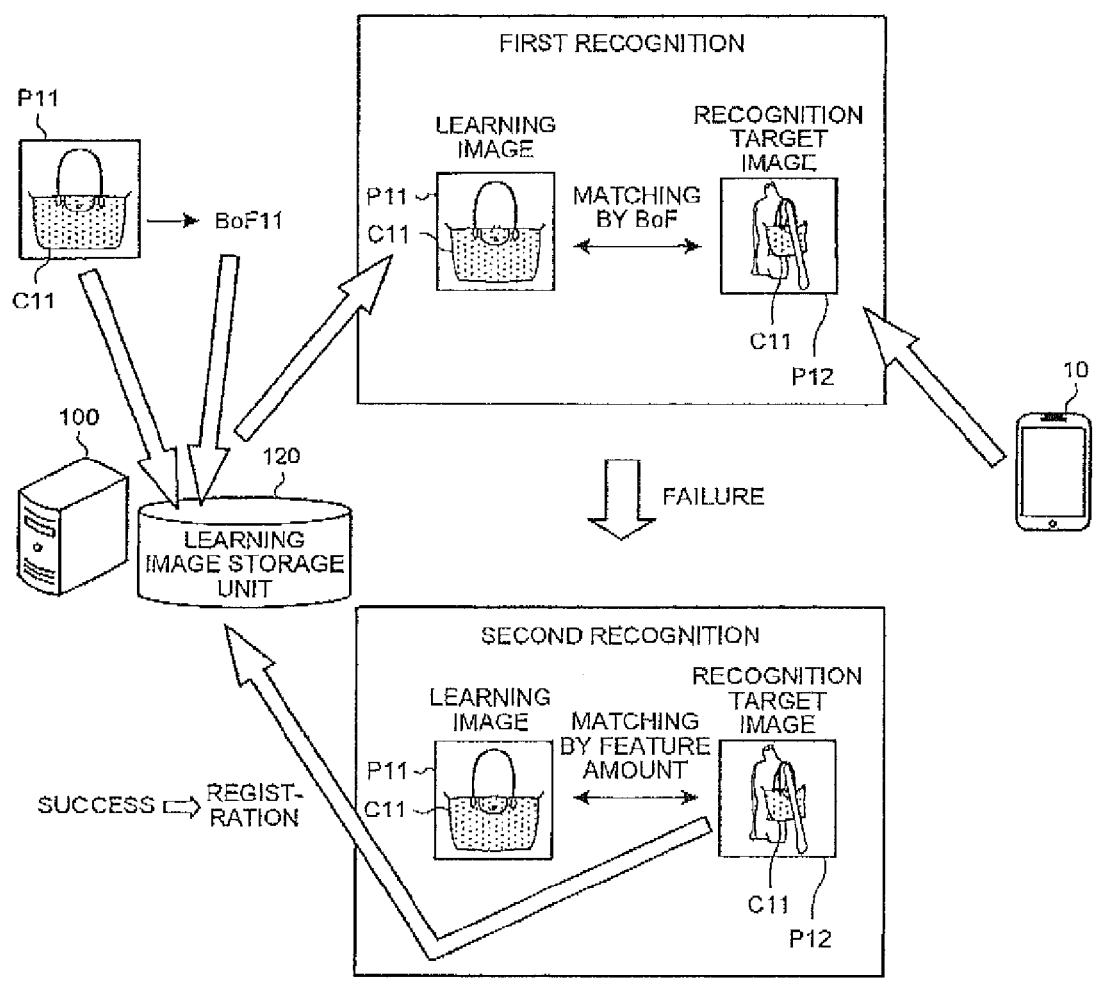
FIG. 1 is an explanatory diagram illustrating an example of a registration processing by a delivery device according to an embodiment.

FI. 7 is a flowchart illustrating the delivery processing by the delivery device according to the embodiment;

FIG. 8 is a flowchart illustrating a first recognition processing by the delivery device according to the embodiment;

FIG. 9 is a flowchart illustrating a second recognition processing by the delivery device according to the embodiment; and FIG. 10 is a diagram of a hardware configuration illustrating an example of a computer that implements functions of the delivery device.

DETAILED DESCRIPTION OF THE PREFERRED EMBODIMENTS

An exemplary embodiment (hereinafter, referred to as an "embodiment") for carrying out an image recognition device, an image recognition method, and a recording medium according to the present invention will be described below in detail with reference to drawings. Further, the image recognition device, the image recognition method, and the recording medium according to the invention are not limited to the embodiment. In addition, the same components will be denoted with the same reference numerals in each of the following embodiments, and the duplicated description will not be presented.

1. Registration Processing

First, an example of a registration processing according to a first embodiment will be described with reference to FIG. 1. FIG. 1 is an explanatory diagram illustrating the example of the registration processing by a delivery system according to the embodiment. In the example of FIG. 1, the registration processing is carried out to register intonation on a recognition target image, which is transmitted from a terminal device 10, in a learning image storage unit 120 through a delivery device 100.

In the example of FIG. 1, the terminal device 10 transmits a recognition target image P12, on which a bag C11 is delineated by a user operating the terminal device 10, to the delivery device 100. Further, the recognition target image P12 is photographed by, for example, a camera embedded in the terminal device 10.

The delivery device 100 stores a learning image P11 in the learning image storage unit 120. Moreover, the learning image P11 is previously registered by an administrator who administers the delivery device 100. In addition, the delivery device 100 generates a BoF (Bag of Features) 11 from the learning image P11. For example, the delivery device 100 generates the BoF11 of the learning image P11 using a Visual Words. Then, the delivery device 100 stores the learning image P11 and BoF11 in association with each other.

In addition, when the recognition target image P12 is received from the terminal device 10, the delivery device 100 performs a first recognition which recognizes the recognition target image P12. For example, the delivery device 100 generates a BoF12 from the received recognition target image P12. Then, the delivery device 100 searches a BoF similar to the BoF12 from BoFs of the learning image stored in the learning image storage unit 120. Subsequently, the delivery device 100 calculates first certainty factors by matching the BoF12 with each searched BoF. Further, the delivery device 100 determines whether or not the maximum certainty factor, which is the largest value among the calculated first certainty factors, is higher than a determination threshold value.

Here, the BoF of the maximum certainty factor is assumed to be the BoF11. In addition, the maximum certainty factor of the BoF11 is assumed to be higher than the determination threshold value. In this case, the delivery device 100 assumes the learning image P11 corresponding to the BoF11 of the maximum certainty factor as a recognition result of the recognition target image P12. That is, the delivery device 100 recognizes the bag C11 delineated on the recognition target image P12 as the bag C11 delineated on the learning image P11 corresponding to the BoF11.

On the other hand, when the maximum certainty factor of the BoF11 is lower than the determination threshold value, the delivery device 100 determines that the recognition of the recognition target image P12 is failed. For example, the delivery device 100 fails to recognize the recognition target image in a case where the recognition target image is faint because the image is photographed under a dark photographing location and a bad photographing condition.

Then, when the recognition of the recognition target image P12 is failed, the delivery device 100 performs a second recognition which is matched finer than the first recognition. For example, the delivery device 100 extracts a local feature amount from all of the learning images corresponding to the first certainty factor higher than a re-determination threshold value. Then, the delivery device 100 allows a feature amount similar to the extracted local feature amount to be associated with the learning image and the recognition target image P12 and then matches coordinates to calculate second certainty factors. Then, the delivery device 100 determines whether or not the maximum certainty factor, which is the largest value among the calculated second certainty factors, is higher than a learning determination threshold value.

Here, the BoF of the maximum certainty factor is assumed to be the BoF11. In addition, the maximum certainty factor of the BoF11 is assumed to be higher than the learning determination threshold value. In this case, the delivery device 100 assumes the learning image P11 corresponding to the BoF11 of the maximum certainty factor as a recognition result of the recognition target image P12. That is, the delivery device 100 recognizes the bag C11 delineated on the recognition target image P12 as the bag C11 delineated on the learning image P11 corresponding to the BoF11. Then, the delivery device 100 registers the successfully recognized recognition target image P12 and the BoF12, in the learning image storage unit 120 in association with a tag of the bag C11, which is a form of meta information, attached to the successfully recognized learning image P11.

For this reason, since the delivery device 100 according to the embodiment performs the first recognition using the BoF, it is possible to recognize the recognition target image at high speed such that an operation quantity is small as compared with the recognition using the local feature amount. In addition, since the delivery device 100 performs the second recognition finer than the first recognition even though the recognition of the recognition target image is failed by the first recognition, it is possible to recognize with high precision even in a case of the recognition target image different in the photographing condition from the learning image. For this reason, the delivery device 100 can register even the recognition target image different in the photographing condition from the learning image as the learning image. In addition, since the delivery device 100 registers the recognized recognition target image as the learning image, hence, in a case of receiving an image similar to the recognition target image, it is possible to recognize such image at high speed. Thus, the delivery device 100 can perform the high-precision image recognition at high speed.

2. Configuration of Delivery System

Figure 2:
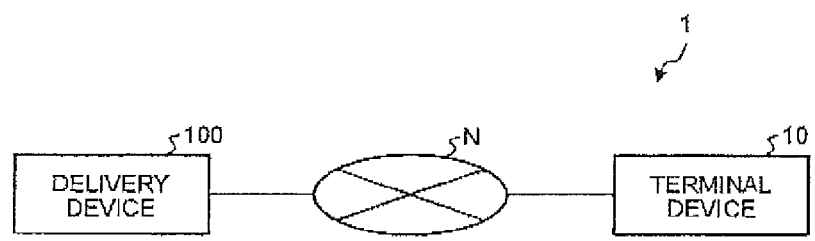
FIG. 2 is a diagram illustrating a configuration example of a delivery system according to the embodiment.

Next, a delivery system 1 according to the first embodiment will be described with reference to FIG. 2. FIG. 2 is a diagram illustrating a configuration example of the delivery system according to the first embodiment. As illustrated in FIG. 2, the delivery system 1 includes a terminal device 10 and the delivery device 100. The terminal device 10 and the delivery device 100 each are connected to a network N to be wirelessly communicated. In FIG. 2, furthermore, the delivery system 1 includes one terminal device 10 and one delivery device 100, as an example, but the delivery system 1 may include a plurality of terminal devices 10 or a plurality of delivery devices 100.

For example, the terminal device 10 is an information processing device such as a smart phone, a tablet terminal, a notebook PC, a mobile telephone, a PDA (Personal Digital Assistant). For example, the terminal device 10 generates the recognition target image, on which a recognition target is delineated, by photographing the recognition target to be recognized by the user using an embedded camera. Then, the terminal device 10 transmits the generated recognition target image to the delivery device 100. Furthermore, the terminal device 10 may transmit an image acquired through an internet to the delivery device 100 as the recognition target image. In addition, the terminal device 10 displays a commodity page, which is a web page relating to an online shopping delivered from the delivery device 100, on a display unit (for example, liquid crystal display).

The delivery device 100 is a server device which delivers the commodity page to the terminal device 10. Specifically, the delivery device 100 performs the recognition of the commodity delineated on the recognition target image and delivers the commodity page relating to the recognized commodity to the terminal device 10, when the recognition target image is transmitted from the terminal device 10.

3. Configuration of Delivery Device

Figure 3:
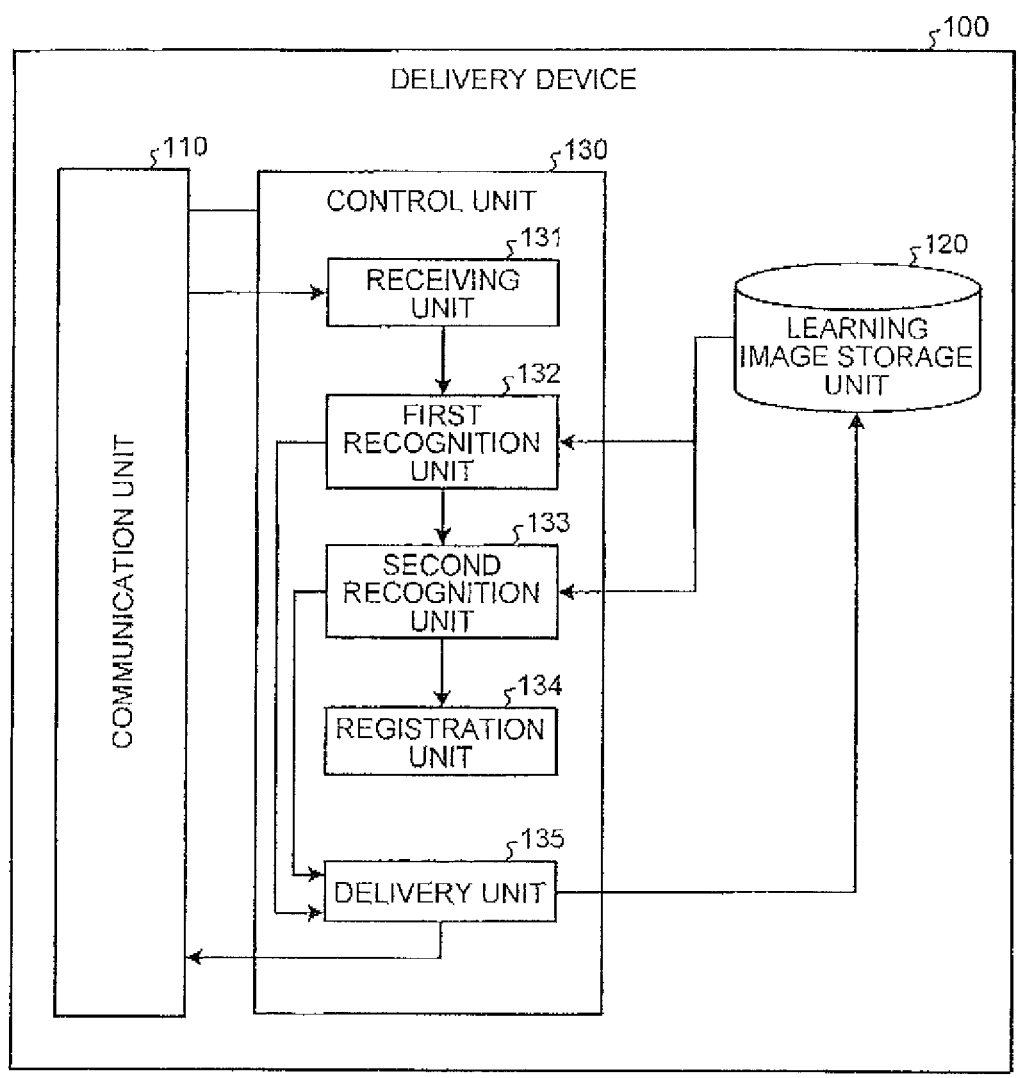
FIG. 3 is a diagram illustrating a configuration example of the delivery device according to the embodiment.

Next, a configuration of the delivery device 100 according to the embodiment will be described with reference to FIG. 3. FIG. 3 is a diagram illustrating a configuration example of, the delivery device 100 according to the embodiment. As illustrated in FIG. 3, the delivery device 100 includes a communication unit 110, the learning image storage unit 120, and a control unit 130. Furthermore, the delivery device 100 may include an input unit (for example, keyboard or mouse) for receiving various operations from the administrator using the delivery device 100 or a display unit (for example, liquid crystal display) for displaying various types of information.

(With Respect to Communication Unit 110)

The communication unit 110 is implemented by, for example, NIC (Network Interface Card). Such communication unit 110 is connected to a network N by wired or wireless and performs transmission and reception to/from the terminal device 10 through the network N.

(With Respect to Learning Image Storage Unit 120)

The learning image storage unit 120 is implemented by, for example, a semiconductor memory device such as a RAM (Random Access Memory) or a flash memory or a storage device such as a hard disk or an optical disk. Such learning image storage unit 120 stores at least one piece of learning image used as a comparison target of the recognition target image. For example, the learning image is an image of the commodity which is sold on the online shopping site. Furthermore, the learning image is input from the administrator who administers the delivery device 100 or an operator who operates an online shopping.

Here, FIG. 4 illustrates an example of the learning image storage unit 120 according to the embodiment. In the example illustrated in FIG. 4, the learning image storage unit 120 includes an item such as a "learning image", a "BoF", and a "tag".

The "learning image" indicates a learning image input from the administrator or the operator. In the example illustrated in FIG. 4, as an example, conceptual information such as a "P01" or "P10" is stored in the "learning image", but in fact, a file path name indicating a storage location of still image or image is stored therein.

The "BoF" indicates a BoF generated from the learning image. For example, when the learning image is input, the BoF is generated by extracting the local feature amount from the learning image and is previously stored in the learning image storage unit 120. In the example illustrated in FIG. 4, as an example, conceptual information such as a "B01" or "B10" is stored in the "BoF", but in fact, the "BoF" indicates a feature vector group extracted from the learning image. The "tag" indicates meta information attached to the learning image. For example, a JAN code of the commodity is set in the "tag" as a form of meta information to identify the commodity delineated on the learning image.

That is, FIG. 4 illustrates an example in which the learning image P11 and the BoF11 of the commodity identified by the tag "J11" are stored.

(With Respect to Control Unit 130)

The control unit 130 is implemented by, for example, a CPU (Central Processing Unit) or an MPU (Micro Processing Unit) in such a manner that various programs (corresponding to an example of an advertisement extracting program) stored in the storage device provided inside the delivery device 100 are executed using a RAM as a work area. In addition, the control unit 130 is implemented by, for example, an integrated circuit such as an ASIC (Application Specific Integrated Circuit) or an FPGA (Field Programmable Gate Array).

As illustrated in FIG. 3, such a control unit 130 includes a receiving unit 131, a first recognition unit 132, a second recognition unit 133, a registration unit 134, and a delivery unit 135 and implements or executes functions or operations of information processing which will be described below. Furthermore, an internal configuration of the control unit 130 is not limited to the configuration illustrated in FIG. 3, but another configuration may be adapted, as long as it performs information processing described below. In addition, a connection relation of each processing unit provided in the control unit 130 is not limited to the connection relation illustrated in FIG. 3, but another connection relation may be adapted.

(With Respect to Receiving Unit 131)

The receiving unit 131 receives the recognition target image from the terminal device 10. For example, the receiving unit 131 receives the recognition target image by receiving a mail, to which the recognition target image is attached, from the terminal device 10. In addition, the receiving unit 131 may receive the recognition target image by uploading the image through a protocol such as HTTP from a terminal device 19, for example.

(With Respect to First Recognition Unit 132)

When the recognition target image is received by the receiving unit 131, the first recognition unit 132 recognizes the commodity delineated on the received recognition target image. Specifically, the first recognition unit 132 recognizes the commodity delineated on the received recognition target image by matching the recognition target image with the learning image stored in the learning image storage unit 120.

By way of example, the first recognition unit 132 generates the BoF from the received recognition target image. Specifically, the first recognition unit 132 extracts a feature point from the recognition target image. Subsequently, the first recognition unit 132 extracts a feature point periphery pattern as an SIFT feature vector (local feature amount) by SIFT descriptor. Then, the first recognition unit 132 quantizes the SIFT feature vector on the basis of the previously calculated Visual Words. Subsequently, the first recognition unit 132 generates the BoF by generating a histogram indicating an appearance frequency of the Visual Words in the recognition target image.

Further, for example, the Visual Words is a cluster which is generated by extracting the SIFT feature vector acting as the local feature amount from all of the learning images stored in the learning image storage unit 120 and then mapping and clustering the extracted SIFT feature vector on a feature amount space. IDs are allocated to this cluster to extract the local feature amount from the image which is a generation target of the BoF and to search a cluster (Visual Words) having a most similar local feature amount, and thus the BoF is generated by vector-representing the appearance frequency of the local feature amount with respect to each ID of the searched cluster. By using the BoF generated using the Visual Words, the certainty factor can more easily be calculated using the vector-represented BoF than in a complicated computation for individually calculating the certainty factor by matching the local feature amounts extracted from the image among the images. Here, when the number of learning images stored in the learning image storage unit 120 is large, the SIFT feature vector may be extracted from the learning image which is randomly sampled.

Then, the first recognition unit 132 searches a BoF similar to the BoF generated by the first recognition unit 132 from the BoFs of the learning image stored in the learning image storage unit 120.

Subsequently, the first recognition unit 132 calculates the first certainty factors by matching each of the searched BoFs with the BoF12. Then, the first recognition unit 132 determines whether or not the maximum certainty factor, which is the largest value among the calculated first certainty factors, is higher than the determination threshold value. Further, the determination threshold value is set as a value obtained in consideration of recognition precision or recognition time depending on the intended use obtained by, for example, experiment.

Here, when the maximum certainty factor is higher than the determination threshold value, the first recognition unit 132 assumes the learning image corresponding to the BoF of the maximum certainty factor as a recognition result of the recognition target image. That is, the first recognition unit 132 recognizes the commodity delineated on the recognition target image as that delineated on the learning image corresponding to the BoF of the maximum certainty factor. Like this, since the first recognition unit 132 recognizes the recognition target image using the BoF, it is possible to recognize the recognition target image at high speed as compared with the recognition using the local feature amount.

On the other hand, when the maximum certainty factor of the BoF is lower than the determination threshold value, the first recognition unit 132 recognizes the second recognition by a second recognition unit 133 which will be described below.

Furthermore, the first recognition unit 132 is not limited to the first certainty factor calculated on the basis of the above-described BoF, but may calculate the first certainty factor by matching coordinates of the feature point of the recognition target image and the feature point of the learning image stored in the learning image storage unit 120.

In addition, the first recognition unit 132 may calculate the certainty factor on the basis of the BoF, calculate the first certainty factor on the basis of the coordinate of the feature point, and calculate the first certainty factor by calculating an average value between the certainty factor calculated on the basis of the BoF and the certainty factor calculated on the basis of the coordinate of the feature point.

(With Respect to Second Recognition Unit 133)

The second recognition unit 133 recognizes the commodity delineated on the recognition target image with finer precision than that of the first recognition unit 132, when the first recognition unit 132 fails to recognize the recognition target image. Specifically, the second recognition unit 133 recognizes the commodity delineated on the recognition target image by matching the recognition target image and the learning image stored in the learning image storage unit 120 with each other.

By way of example, the second recognition unit 133 determines whether or not the first certainty factor, which is higher than the re-determination threshold value among the first certainty factors calculated by the first recognition unit 132, is present. Further, the re-determination threshold value is set to a value lower than the determination threshold value used in the recognition by the first recognition unit 132. Here, the second recognition unit 133 extracts the local feature amount from all of the learning images corresponding to the certainty factor higher than the re-determination threshold value, when the first certainty factor higher than the re-determination threshold value is present.

Then, the second recognition unit 133 allows the feature amount similar to the extracted local feature amount to be associated with the learning image and the recognition target image. And then, the second recognition unit 133 calculates the second certainty factors by matching the coordinate among the feature amount associated and the learning image with the feature amount associated with the recognition target image. Then, the second recognition unit 133 determines whether or not the maximum certainty factor, which is the largest value among the calculated second certainty factors, is higher than the learning determination threshold value.

Here, when the maximum certainty factor is higher than the learning determination threshold value, the second recognition unit 133 assumes the learning image corresponding to the maximum certainty factor as a recognition result of the recognition target image. That is, the second recognition unit 133 recognizes the commodity delineated on the recognition target image as that delineated on the learning image corresponding to the maximum certainty factor.

On the other hand, when the maximum certainty factor is lower than the learning determination threshold value, the second recognition unit 133 terminates the second recognition processing.

(With Respect to Registration Unit 134)

When the recognition result of the recognition target image is present, the registration unit 134 stores information on such recognition target image in the learning image storage unit 120. For example, when the recognition result of the recognition target image is present, the registration unit 134 registers the recognition target image and the BoF of the recognition target image, which are associated with the tag of the commodity, in the learning image storage unit 120.

In addition, when the recognition result of the recognition target image is present, the registration unit 134 may extract and register a portion corresponding to the learning image area assumed as the recognition result from the recognition target image. Accordingly, since the registration unit 134 registers the image, in which the portion of the recognition target is cutout by exclusion of a background included in the recognition target image, as the learning image, it is possible to increase recognition precision.

(With Respect to Delivery Unit 135)

When the commodity delineated on the recognition target image is recognized by the first recognition unit 132 or the second recognition unit 133, the delivery unit 135 delivers the commodity page of such commodity to the terminal device 10 acting as a transmission source of the recognition target image.

Figure 5:
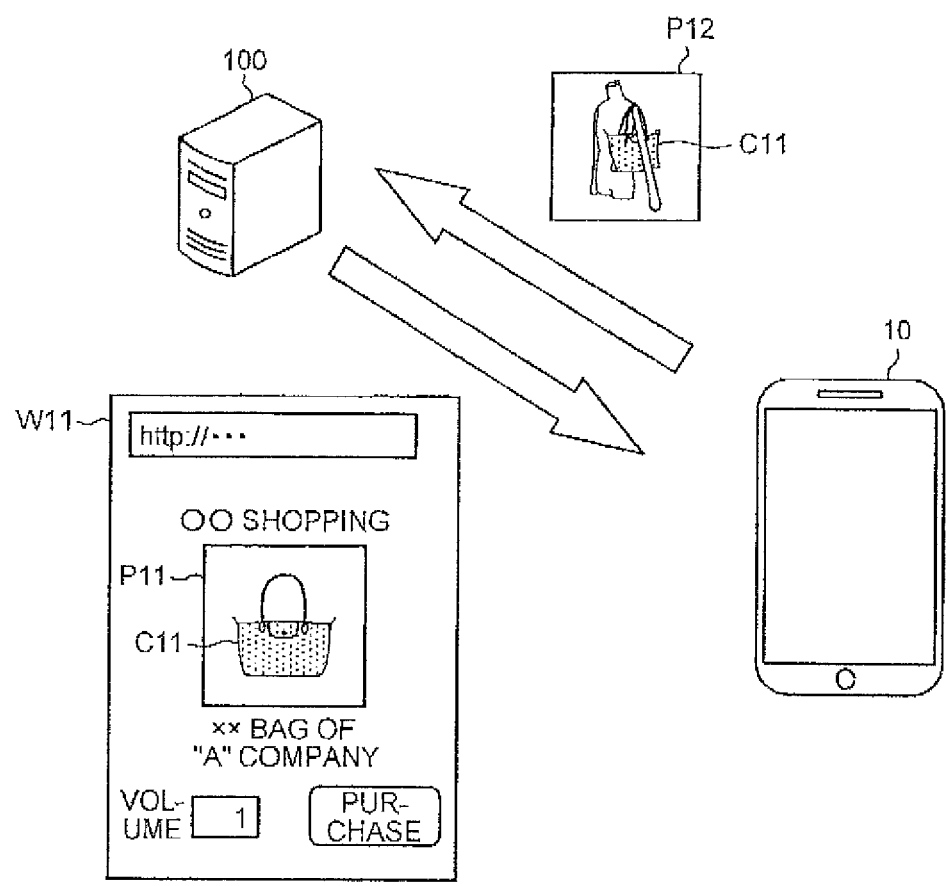
FIG. 5 is an explanatory diagram illustrating an example of a delivery processing by the delivery device according to the embodiment.

FIG. 5 is an explanatory diagram illustrating an example of a delivery processing by the delivery device 100 according to the embodiment. As illustrated in FIG. 5, when the commodity C11 delineated on the recognition target image P12 is recognized, the delivery unit 135 delivers the commodity page W11 of the commodity C11 to the terminal device 10.

4. Example of Recognition Processing

An example of the recognition processing by the above-described first recognition unit 132 and second recognition unit 133 will be described with reference to FIGS. 4 and 6. FIG. 6 is an explanatory diagram illustrating an example of the recognition processing by the delivery device according to the embodiment. As illustrated in FIG. 6, the delivery device 100 receives the recognition target image P12 from the terminal device 10. In this case, the first recognition unit 132 generates the BoF12 from the received recognition target image P12. Then, the first recognition unit 132 searches the BoF similar to the BoF12 from the BoF of the learning image stored in the learning image storage unit 120.

Here, it is assumed that the BoF11 of the learning image P11, the BoF13 of the learning image P13, and the BoF14 of the learning image P14 are searched by the first recognition unit 132. In this case, the first recognition unit 132 calculates the first certainty factors by matching the searched BoF11, BoF13, and BoF14 with the BoF12.

Then, the first recognition unit 132 determines whether or not the maximum certainty factor, which is the largest value among the calculated first certainty factors, is higher than a predetermined determination threshold value. Here, the BoF of the maximum certainty factor is assumed to be the BoF11. In addition, the maximum certainty factor of the BoF11 is assumed to be lower than the determination threshold value.

In this case, the first recognition unit 132 determines that the recognition of the recognition target image P12 is failed. Then, when the recognition of the recognition target image 112 is failed, the second recognition unit 133 performs the second recognition which is matched finer than the first recognition. Specifically, the second recognition unit 133 determines whether or not the BoF of the first certainty factor, which is higher than the re-determination threshold value, is present. Here, the first certainty factor of the BoF11 and the BoF13 is assumed to be higher than the re-determination threshold value.

In this case, the second recognition unit 133 extracts the local feature amount from the learning image P11 and the learning image P13 corresponding to the BoF11 and the BoF13. Further, the second recognition unit 133 does not extract the local feature amount of the learning image P14 corresponding to the BoF14 lower than the re-determination threshold value.

Then, the second recognition unit 133 allows the feature amounts similar to the local feature amounts of the extracted BoF11 and BoF13 to be associated with the feature amount of the recognition target image P12 and then matches the coordinates to calculate the second certainty factors. Then, the second recognition unit 133 determines whether or not the maximum certainty factor, which is the largest value among the calculated second certainty factors, is higher than the predetermined learning determination threshold value.

Here, the BoF of the maximum certainty factor is assumed to be the BoF11. In addition, the maximum certainty factor of the BoF11 is assumed to be higher than the predetermined learning determination threshold value. In this case, the second recognition unit 133 assumes the learning image P11 corresponding to the BoF11 of the maximum certainty factor as the recognition result of the recognition target image P12. Then, the registration unit 134 registers the recognition target image P12 and the BoF12 in the learning image storage unit 120 in association with the tag "J11" of the bag C11.

5. Delivery Processing Procedure

Next, a processing procedure by the delivery device 100 according to the embodiment will be described with reference to FIG. 7. FIG. 7 is a flowchart illustrating the delivery processing procedure by the delivery device 100 according to the embodiment.

As illustrated in FIG. 7, the delivery device 100 executes a first recognition processing (Step S101). Subsequently, the delivery device 100 determines whether or not the recognition result of the recognition target image is present (Step S102). Here, when the recognition result of the recognition target image is present (Yes in step S102), the delivery device 100 delivers the commodity page of the recognized commodity to the terminal device (Step S107).

On the other hand, when the recognition result of the recognition target image is not present (No in step S102), the delivery device 100 determines whether or not the first certainty factor higher than the re-determination threshold value is present (Step S103). Here, when the first certainty factor higher than the re-determination threshold value is not present, the delivery device 100 terminates the delivery processing (No in Step S102).

On the other hand, when the first certainty factor higher than the re-determination threshold value is present, the delivery device 100 executes a second recognition processing (Step S104). Subsequently, the delivery device 100 determines whether or not the recognition result of the recognition target image is present (Step S105). Here, when the recognition result of the recognition target image is not present, the delivery device 100 terminates the delivery processing (No in Step S105).

On the other hand, when the recognition result of the recognition target image is present, the delivery device 100 registers the recognition target image and the BoF of the recognition target image in the learning image storage unit 120 (Step S106). In addition, the delivery device 100 delivers the commodity page of the commodity recognized in step S101 or step S104 to the terminal device 10. Thus, the terminal device 10 displays the commodity page delivered in step S107 on the display unit.

6. First Recognition Processing Procedure

Next, a processing procedure by the delivery device 100 according to the embodiment will be described with reference to FIG. 8. FIG. 8 is a flowchart illustrating a first recognition processing procedure by the delivery device 100 according to the embodiment.

As illustrated in FIG. 8, the delivery device 100 extracts the local feature amount of the recognition target image (Step S201). Then, the delivery device 100 generates the BoF of the recognition target image (Step S202).

Subsequently, the delivery device 100 searches a BoF similar to the generated BoF from the BoFs stored in the learning image storage unit 120 (Step S203). For example, this search employs an inverted index using the BoF as an index. Then, the delivery device 100 calculates the first certainty factors for each of the searched BoFs (Step S204).

Subsequently, the delivery device 100 determines whether or not the maximum certainty factor of the calculated first certainty factors is higher than the determination threshold value (Step S205). Here, when the maximum certainty factor is lower than the determination threshold value, the delivery device 100 terminates the first recognition processing procedure (No in Step S205).

On the other hand, when the maximum certainty factor is higher than the determination threshold value, the delivery device 100 assumes the learning image corresponding to the maximum certainty factor as the recognition result (Step S206).

7. Second Recognition Processing Procedure

Next, a processing procedure by the delivery device 100 according to the embodiment will be described with reference to FIG. 9. FIG. 9 is a flowchart illustrating a second recognition processing procedure by the delivery device 100 according to the embodiment.

As illustrated in FIG. 9, the delivery device 100 extracts the local feature amount from a learning image of first certainty factor higher than the re-determination threshold value (Step S301). Then, the delivery device 100 allows the feature amount similar to the local feature amount to be associated with the learning image and the recognition target image (Step S302).

Subsequently, the delivery device 100 calculates the second certainty factors by matching the coordinates of the feature amounts which are associated with the learning image and the recognition target image (Step S303). Then, the delivery device 100 determines whether or not the maximum certainty factor of the calculated second certainty factors is higher than the learning determination threshold value (Step S304).

Here, when the maximum certainty factor is lower than the learning determination threshold value, the delivery device 100 terminates the second recognition processing (No in Step S304).

On the other hand, when the maximum certainty factor is higher than the learning determination threshold value, the delivery device 100 assumes the learning image corresponding to the maximum certainty factor as the recognition result (Step S305).

8. Effects

As described above, the delivery device 100 according to the embodiment includes the learning image storage unit 120 (corresponding to an example of storage unit), the first recognition unit 132, the second recognition unit 133, and the registration unit 134. The learning image storage unit 120 stores the learning image. The first recognition unit 132 recognizes the recognition target image using the learning image stored in the learning image storage unit 120. The second recognition unit 133 recognizes the recognition target image with finer precision than that of the first recognition unit, when the first recognition unit fails to recognize the recognition target image. When the second recognition unit succeeds in recognizing the recognition target image, the registration unit 134 registers the information on the successfully recognized recognition target image in the storage unit.

For this reason, since the delivery device 100 according to the embodiment performs the second recognition finer than the first recognition even though the recognition of the recognition target image is failed by the first recognition, it is possible to recognize with high precision even in the case of the recognition target image different in the photographing condition from the learning image. For this reason, the delivery device 100 can register even the recognition target image different in the photographing condition from the learning image, as the learning image. In addition, since the delivery device 100 registers the recognized recognition target image as the learning image, hence, it is possible to recognize such image at high speed in the case of receiving the image similar to the recognition target image. Thus, the delivery device 100 can perform the high-precision image recognition at high speed. In addition, the user of the terminal device 10 can know the commodity delineated on the recognition target image. Moreover, the administrator of the online shopping can improve the user's motivation to purchase the commodity.

Furthermore, in the delivery device 100 according to the embodiment, the first recognition unit 132 calculates the first certainty factor on the basis of the learning image and the recognition target image. The second recognition unit 133 recognizes the recognition target image with finer precision than that of the first recognition unit, when the first certainty factor calculated by the first recognition unit 132 is higher than the predetermined re-determination threshold value which is the value lower than the predetermined determination threshold value.

For this reason, since the delivery device 100 according to the embodiment performs the first recognition more coarse than the second recognition, it is possible to recognize the recognition target image at high speed such that the operation quantity is small as compared with the image recognition using the local feature amount. In addition, since the delivery device 100 according to the embodiment performs the second recognition finer than that of the first recognition even though the recognition of the recognition target image is failed by the first recognition, it is possible to recognize with high precision even in a case where the recognition target image is different in the photographing condition from the learning image. For this reason, the delivery device 100 according to the embodiment can register even recognition target image which is different in the photographing condition from the learning image, as the learning image. In addition, since the delivery device 100 according to the embodiment registers the successfully recognized recognition target image in the learning image storage unit 120, hereinafter, even in a case of receiving the image similar to the recognition target image having a coarse image quality, it is possible to recognize such image at high speed.

Furthermore, in the delivery device 100 according to the embodiment, the learning image storage unit 120 further stores the BoFs of the learning image. The first recognition unit 132 generates the BoF of the recognition target image and calculates the first certainty factor on the basis of the generated BoF of the recognition target image and the BoFs of the learning image stored in the learning image storage unit 120. The second recognition unit 133 calculates the second certainty factor on the basis of the feature amount of the learning image and the feature amount of the recognition target image.

For this reason, since the delivery device 100 according to the embodiment performs the first recognition using BoF, it is possible to recognize the recognition target image at high speed such that the operation quantity is small as compared with the image recognition using the local feature amount. In addition, since the delivery device 100 performs the second recognition using the feature amount, it is possible to recognize the recognition target image with high precision.

Furthermore, in the delivery device 100 according to the embodiment, the first recognition unit 132 extracts the local feature amount of the recognition target image, generates the BoF from the extracted local feature amount, searches the generated BoF from the BoFs of the learning image stored in the learning image storage unit 120, calculates the first certainty factors between the each searched BoF and the BoF of the recognition target image, and, when the maximum certainty factor which is the largest value among the calculated first certainty factors is higher than the predetermined determination threshold value, recognizes the recognition target image as the learning image corresponding to the BoF of the maximum certainty factor.

Therefore, since the delivery device 100 according to the embodiment performs the first recognition using BoF, it is possible to recognize the recognition target image at high speed with the small operation quantity.

Furthermore, in the delivery device 100 according to the embodiment, the first recognition unit 132 extracts the local feature amount of the recognition target image, generates the BoF from the extracted local feature amount, searches the generated BoF from the BoFs of the learning image stored in the learning image storage unit 120, calculates the first certainty factors by matching the coordinate of the feature point of each learning image corresponding to the searched BoF with the coordinate of the feature point of the recognition target image, and, when the maximum certainty factor which is the largest value among the calculated first certainty factors is higher than the determination threshold value, recognizes the recognition target image as the learning image corresponding to the maximum certainty factor.

For this reason, since the delivery device 100 according to the embodiment performs the first recognition using the coordinate of the feature point, it is possible to recognize the recognition target image with high precision.

Furthermore, in the delivery device 100 according to the embodiment, the first recognition unit 132 extracts the local feature amount of the recognition target image, generates the BoF from the extracted local feature amount, searches the generated BoF from the BoFs of the learning image stored in the learning image storage unit 120, calculates the BoF certainty factor between the each searched BoF and the BoF of the recognition target image and the certainty factor of feature amount by matching the coordinate of the feature point of each learning image corresponding to the searched BoF with the coordinate of the feature amount of the recognition target image, calculates the first certainty factors by calculating the average between the BoF certainty factor and the certainty factor of feature amount the BoF certainty factor, and, when the maximum certainty factor which is the largest value among the calculated first certainty factors is higher than the determination threshold value, recognizes the recognition target image as the learning image corresponding to the maximum certainty factor.

For this reason, since the delivery device 100 according to the embodiment performs the first recognition using the BoF and the coordinate of the feature point, it is possible to recognize the recognition target image with high precision.

Furthermore, in the delivery device 100 according to the embodiment, the second recognition unit 133 extracts the local feature amount from the learning image corresponding to the first certainty factor higher than the re-determination threshold value which is the value lower than the determination threshold value, allows the feature amount similar to the extracted local feature amount to be associated with the learning image and the recognition target image and then matches the coordinates to calculate the second certainty factors, and, when the maximum certainty factor which is the largest value among the calculated second certainty factors is higher than the predetermined learning determination threshold value, recognizes the recognition target image as the learning image corresponding to the maximum certainty factor.

For this reason, since the delivery device 100 according to the embodiment performs the second recognition using the feature amount, it is possible to, recognize the recognition target image with high precision.

Furthermore, in the delivery device 100 according to the embodiment, when the second recognition unit 133 succeeds in recognizing the recognition target image, the registration unit 134 registers the successfully recognized recognition target image and the BoF corresponding to the recognition target image in the learning image storage unit 120.

For this reason, since the delivery device 100 according to the embodiment registers the successfully recognized recognition target image, hereinafter, even in a case of receiving the image similar to the recognition target image having a coarse image quality, it is possible to recognize such image at high speed.

Furthermore, in the delivery device 100 according to the embodiment, when the second recognition unit 133 succeeds in recognizing the recognition target image, the registration unit 134 registers the successfully recognized recognition target image in the learning image storage unit 120, in association with meta information attached to the successfully recognized learning image.

For this reason, the delivery device 100 according to the embodiment can identify the recognition target delineated on the recognition target image on the basis of the meta information.

9. Others

In each processing described in the above embodiment, all or some of the automatic types of processing can be carried out manually or all or some of the manual types of processing can be carried out automatically by a known method. In addition to this, the processing procedures, specific names, information including various types of data or parameters, which are illustrated in the above description or drawings, may be arbitrarily changed unless otherwise specified.

In addition, each component of each device illustrated in the drawings is merely a functional concept and thus may be not required to be physically configured as illustrated in the drawings. That is, specific types of dispersion or integration of each device are not limited to those illustrated in the drawings. Each device may be configured in a way that all or some are functionally or physically dispersed or integrated with an arbitrary basis according to various loads or usage status.

For example, the learning image storage unit 120 illustrated in FIG. 4 may be held in a storage server without being held in the delivery device 100. In this case, the delivery device 100 acquires the information on the learning image by an access to the storage server.

In addition, the delivery device 100 may be a recognition device which performs only the recognition processing by the first recognition unit 132 and the second recognition unit 133 without performing the delivery processing of the commodity page. In this case, the recognition device does not include at least the registration unit 134 and the delivery unit 135. Then, the registration device including the registration unit 134 stores the recognition target image successfully recognized by the recognition unit in the learning image storage unit 120. In addition, the delivery device including the delivery unit 135 delivers the commodity page of the commodity, which is recognized by the recognition unit, to the terminal device 10 or the like.

Further, the delivery device 100 according to the above embodiment is implemented by a computer 70 which is configured as illustrated in FIG. 10, for example. FIG. 10 is a diagram of a hardware configuration illustrating an example of the computer 70 which implements functions of the delivery device 100. The computer 7D is provided with a CPU 71, a RAM 72, a Read Only Memory (ROM) 73, a Hard Disk Drive (HDD) 74, a communication interface (I/F) 75, an input/output interface (I/F) 76, and a media interface (I/F) 77.

The CPU 71 operates on the basis of a program stored in the ROM 73 or the HDD 74 to control each unit. The ROM 73 stores a boot program which is executed by the CPU 71 at the time of activation of the computer 70 or a program which is dependent on the hardware of the computer 70.

The HDD 74 stores programs executed by the CPU 71 and data used by these programs. The communication interface 75 receives data from other devices through a communication line N to send the received data to the CPU 71 and transmits the data generated by the CPU 71 to other devices through the communication line N.

The CPU 71 controls an output device such as a display or a printer and an input device such as a keyboard or a mouse through the input/output interface 76. The CPU 71 acquires data from the input device through the input/output interface 76. In addition, the CPU 71 outputs the generated data to the output device through the input/output interface 76.

The media interface 77 reads out a program or data stored in a recording medium 78 and provides the read program or data to the CPU 71 through the RAM 72. The CPU 71 loads the program into the RAM 72 from the recording medium 78 through the media interface 77 and executes the loaded program. The recording medium 78 is, for example, an optical recording medium such as a Digital Versatile Disc (DVD) or a Phase change rewritable Disk (PD), a magneto-optical recording medium such as a Magneto-Optical disk (MO), a tape medium, a magnetic recording medium, or semiconductor memory.

In a case where the computer 70 functions as the delivery device 100 in the embodiment, the CPU 71 of the computer 70 implements each function of the receiving unit 131, the first recognition unit 132, the second recognition unit 133, the registration unit 134, and the delivery unit 135 by executing the program loaded into the RAM 72. In addition, data within the learning image storage unit 120 is stored in the HDD 74.

The CPU 71 of the computer 70 reads out these programs from the recording medium 78 and executes the read programs, but as another example, may acquire these programs from other devices through the communication line N.

In addition, the configuration of the above-described delivery device 100 can be flexibly changed such that the delivery device 100 may be implemented by a plurality of server computers and by calling out an external platform using an Application Programming Interface (API) or a network computing depending on the function.

In addition, the "section, module, or unit" described in claims can be read into a "means" or a "circuit". For example, the receiving unit can be read into a receiving means or a receiving circuit.

According to one aspect of embodiments, an effect capable of performing high-precision image recognition at high speed is achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image recognition device, comprising:
a memory configured to store at least one learning image; and
a processor configured to:
firstly recognize a recognition target image using the learning image stored in the memory;
secondly recognize the recognition target image with finer precision than that of the firstly recognizing, when the firstly recognizing fails to recognize the recognition target image; and
register information on the successfully recognized recognition target image as a learning image in the memory only when not the firstly recognizing, but the secondly recognizing succeeds in recognizing the recognition target image.

2. The image recognition device according to claim 1, wherein the processor is further configured to:
calculate a first certainty factor on the basis of the learning image and the recognition target image, and
perform the process of the secondly recognizing, when the first certainty factor is higher than a predetermined re-determination threshold value which is a value lower than a predetermined determination threshold value.

3. The image recognition device according to claim 1, wherein
the memory is further configured to: store Bags of Features (BoFs) of the learning image, and
the processor is further configured to:
generate a Bag of Features (BoF) of the recognition target image,
calculate a first certainty factor on the basis of the generated BoF of the recognition target image and the BoFs of the learning image stored in the memory, and
calculate a second certainty factor on the basis of a feature amount of the learning image and a feature amount of the recognition target image.

4. The image recognition device according to claim 2, wherein
the memory is further configured to: store Bags of Features (BoF) of the learning image, and
the processor is further configured to:
generate a Bag of Features (BoF) of the recognition target image,
calculate a first certainty factor on the basis of the generated BoF of the recognition target image and the BoFs of the learning image stored in the memory, and
calculate a second certainty factor on the basis of a feature amount of the learning image and a feature amount of the recognition target image.

5. The image recognition device according to claim 1, wherein
the memory is further configured to: store Bags of Features (BoFs) of the learning image, and
the processor is further configured to:
extract a local feature amount of the recognition target image,
generate a Bag of Features (BoF) from the extracted local feature amount,
search the generated BoF from the BoFs of the learning image stored in the memory,
calculate first certainty factors between the each searched BoF and a BoF of the recognition target image, and
when a maximum certainty factor which is the largest value among the calculated first certainty factors is higher than a predetermined determination threshold value, recognize the recognition target image as a learning image corresponding to a BoF of the maximum certainty factor.

6. The image recognition device according to claim 2, wherein
the memory is further configured to: store Bags of Features (BoFs) of the learning image, and
the processor is further configured to:
extract a local feature amount of the recognition target image,
generate a BoF from the extracted local feature amount,
search the generated BoF from the BoFs of the learning image stored in the memory,
calculate first certainty factors between the each searched BoF and a BoF of the recognition target image, and
when a maximum certainty factor which is the largest value among the calculated first certainty factors is higher than a predetermined determination threshold value, recognize the recognition target image as a learning image corresponding to a BoF of the maximum certainty factor.

7. The image recognition device according to claim 1, wherein
the memory is further configured to:
store Bags of Features (BoFs) of the learning image, and
the processor is further configured to:
extract a local feature amount of the recognition target image,
generate a Bag of Features (BoF) from the extracted local feature amount,
search the generated BoF from the BoFs of the learning image stored in the memory,
calculate first certainty factors by matching a coordinate of a feature point of each learning image corresponding to the searched BoF with a coordinate of a feature point of the recognition target image, and
when a maximum certainty factor which is the largest value among the calculated first certainty factors is higher than a determination threshold value, recognize the recognition target image as a learning image corresponding to the maximum certainty factor.

8. The image recognition device according to claim 2, wherein
the memory is further configured to: store Bags of Features (BoFs) of the learning image, and
the processor is further configured to:
extract a local feature amount of the recognition target image,
generate a Bag of Features (BoF), from the extracted local feature amount,
search the generated BoF from the BoFs of the learning image stored in the memory,
calculate first certainty factors by matching a coordinate of a feature point of each learning image corresponding to the searched BoF with a coordinate of a feature point of the recognition target image, and when a maximum certainty factor which is the largest value among the calculated first certainty factors is higher than a determination threshold value, recognize the recognition target image as a learning image corresponding to the maximum certainty factor.

9. The image recognition device according to claim 1, wherein
the memory is further configured to: store Bags of Features (BoFs) of the learning image, and
the processor is further configured to:
extract a local feature amount of the recognition target image,
generate a Bag of Features (BoF) from the extracted local feature amount,
search the generated BoF from the BoFs of the learning image stored in the memory,
calculate a BoF certainty factor between the each searched BoF and a BoF of the recognition target image and a certainty factor of feature amount by matching a coordinate of a feature point of each learning image corresponding to the searched BoF with a coordinate of a feature point of the recognition target image,
calculate first certainty factors by calculating an average between the BoF certainty factor and the certainty factor of feature amount, and
when a maximum certainty factor which is the largest value among the calculated first certainty factors is higher than a determination threshold value, recognize the recognition target image as a learning image corresponding to the maximum certainty factor.

10. The image recognition device according to claim 2, wherein the memory is further configured to: store Bags of Features (BoFs) of the learning image, and
the processor is further configured to:
extract a local feature amount of the recognition target image,
generate a Bag of Features (BoF) from the extracted local feature amount,
search the generated BoF from the BoFs of the learning image stored in the memory,
calculate a BoF certainty factor between the each searched BoF and a BoF of the recognition target image and a certainty factor of feature amount by matching a coordinate of a feature point of each learning image corresponding to the searched BoF with a coordinate of a feature point of the recognition target image,
calculate first certainty factors by calculating an average between the BoF certainty factor and the certainty factor of feature amount, and
when a maximum certainty factor which is the largest value among the calculated first certainty factors is higher than a determination threshold value, recognize the recognition target image as a learning image corresponding to the maximum certainty factor.

11. The image recognition device according to claim 1, wherein the processor is further configured to:
extract a local feature amount from a learning image corresponding to a first certainty factor higher than a re-determination threshold value which is a value lower than a determination threshold value,
allow a local feature amount similar to the extracted local feature amount to be associated with a learning image and the recognition target image, and then match coordinates to calculate second certainty factors, and,
when a maximum certainty factor which is the largest value among the calculated second certainty factors is higher than a predetermined learning determination threshold value, recognize the recognition target image as a learning image corresponding to the maximum certainty factor.

12. The image recognition device according to claim 2, wherein the processor is further configured to:
extract a local feature amount from a learning image corresponding to a first certainty factor higher than a re-determination threshold value which is a value lower than a determination threshold value,
allow a local feature amount similar to the extracted local feature amount to be associated with a learning image and the recognition target image, and then match coordinates to calculate second certainty factors, and,
when a maximum certainty factor which is the largest value among the calculated second certainty factors is higher than a predetermined learning determination threshold value, recognize the recognition target image as a learning image corresponding to the maximum certainty factor.

13. The image recognition device according to claim 1, wherein processor is further configured to: when the secondly recognizing succeeds in recognizing the recognition target image, register the successfully recognized recognition target image and a Bag of Features (BoF) corresponding to the recognition target image in the memory.

14. The image recognition device according to claim 2, wherein processor is further configured to: when the secondly recognizing succeeds in recognizing the recognition target image, register the successfully recognized recognition target image and a Bag of Features (BoF) corresponding to the recognition target image in the memory.

15. The image recognition device according to claim 1, wherein the processor is further configured to: when the secondly recognizing succeeds in recognizing the recognition target image, register the successfully recognized recognition target image in the memory in association with meta information attached to the successfully recognized learning image.

16. The image recognition device according to claim 2, wherein the processor is further configured to: when the secondly recognizing succeeds in recognizing the recognition target image, register the successfully recognized recognition target image in the memory in association with meta information attached to the successfully recognized learning image.

17. An image recognition method that is executed by an image recognition device, the method comprising;
storing, in a memory, at least one learning image;
firstly recognizing a recognition target image using the learning image stored in the memory;
secondly recognizing the recognition target image with finer precision than that of the firstly recognizing, when the firstly recognizing fails to recognize the recognition target image; and
registering information on the successfully recognized recognition target image as a learning image in the memory only when not the firstly recognizing, but the secondly recognizing succeeds in recognizing the recognition target image.

18. The image recognition method according to claim 17, further comprising:
calculating a first certainty factor on the basis of the learning image and the recognition target image, and performing the process of the secondly recognizing, when the first certainty factor is higher than a predetermined re-determination threshold value which is a value lower than a predetermined determination threshold value.

19. A non-transitory recording medium on which an image recognition program is recorded, the recording medium being executed by a computer and comprising:

storing, in a memory, at least one learning image;

firstly recognizing a recognition target image using the learning image stored in the memory;

secondly recognizing the recognition target image with finer precision than that of the firstly recognizing, when the firstly recognizing fails to recognize the recognition target image; and registering information on the successfully recognized recognition target image as a learning image in the memory only when not the firstly recognizing, but the secondly recognizing succeeds in recognizing the recognition target image.

20. The recording medium according to claim 19, wherein the processor is further configured to:

calculate a first certainty factor on the basis of the learning image and the recognition target image, and perform the process of the secondly recognizing, when the first certainty factor is higher than a predetermined re-determination threshold value which is a value lower than a predetermined determination threshold value.

\* \* \* \* \*